United States Patent

[11] 3,599,927

[72] Inventor Yorck Joachim Talbot
  7 Ballenstedterstrasse, 1000 Berlin, Germany
[21] Appl. No. 801,031
[22] Filed Feb. 20, 1969
[45] Patented Aug. 17, 1971
[32] Priority July 5, 1968
[33] Germany
[31] P 17 55 899.5

[54] REARVIEW MIRROR
  14 Claims, 13 Drawing Figs.
[52] U.S. Cl. .................................................. 248/484, 248/487
[51] Int. Cl. ................................................... B60m 1/06
[50] Field of Search ........................................ 248/484, 487, 479, 481, 476, 485, 482

[56] References Cited
  FOREIGN PATENTS
  683,791 4/1964 Canada ........................ 248/485

824,217 11/1959 Great Britain ................ 248/479
Primary Examiner—Edward C. Allen
Attorney—Michael S. Striker ABSTRACT: An external rearview mirror for motor vehicles includes a base mountable on the coachwork of the vehicle. An arm is mounted on the base projecting therefrom and is tiltable about an axis which at least substantially parallels the longitudinal axis of the vehicle so as to be movable from an operating position in which it projects laterally beyond the coachwork to a retracted position. A mirror-head is associated with the arm and means is provided which mounts the mirror-head on the arm for turning movement about an upright axis normal to the longitudinal axis of the vehicle, and this means is operative for effecting tilting of the arm about the axis paralleling the longitudinal axis of the vehicle in direction towards the coachwork in response to turning movement of the mirror-head initiated by an impact on the same acting in direction of the longitudinal vehicle axis.

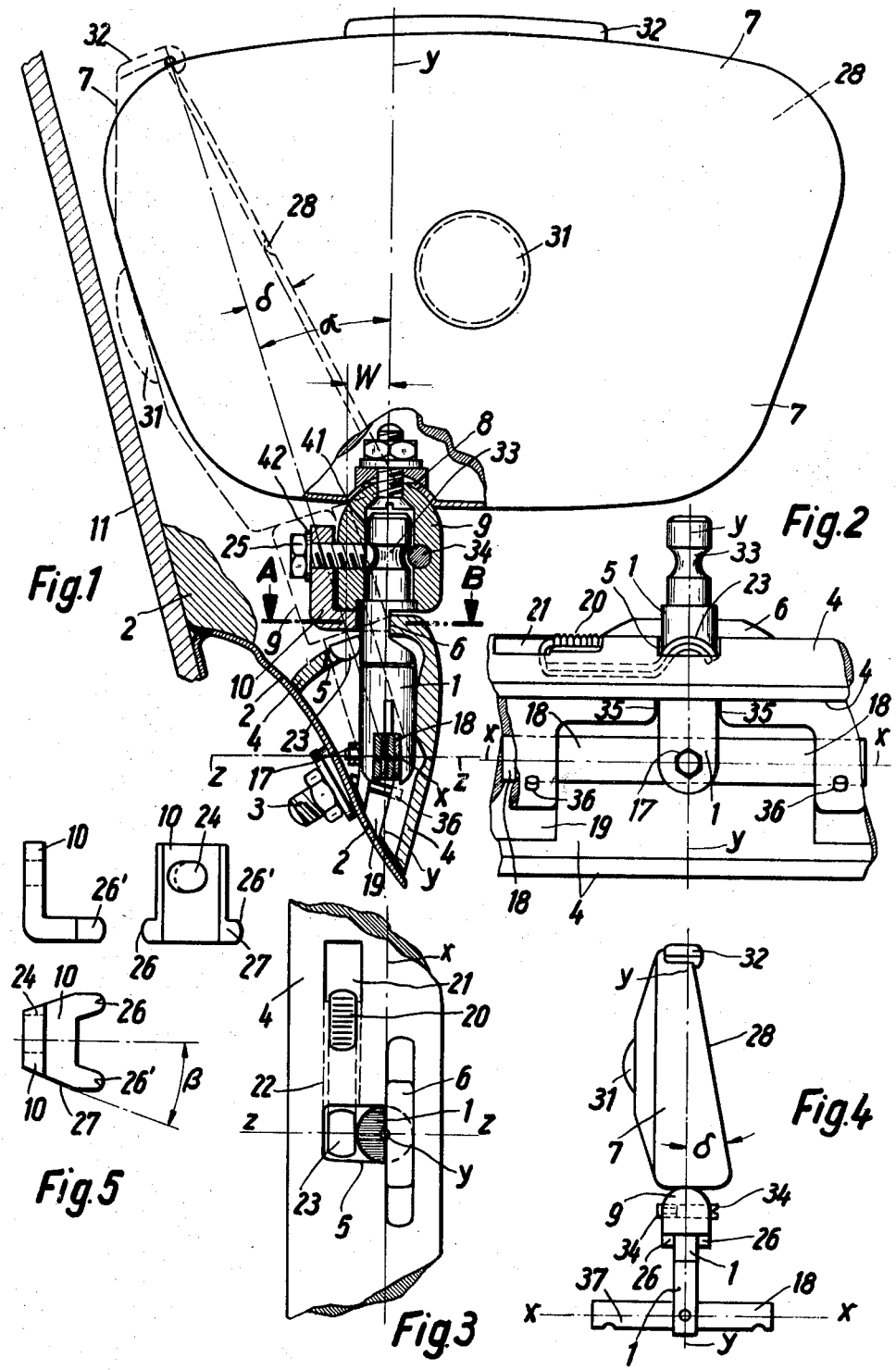

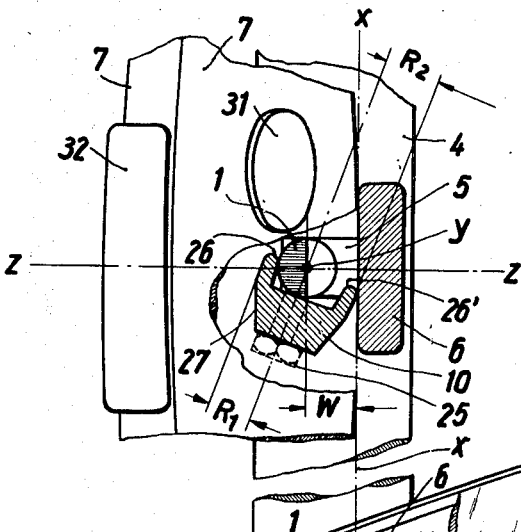
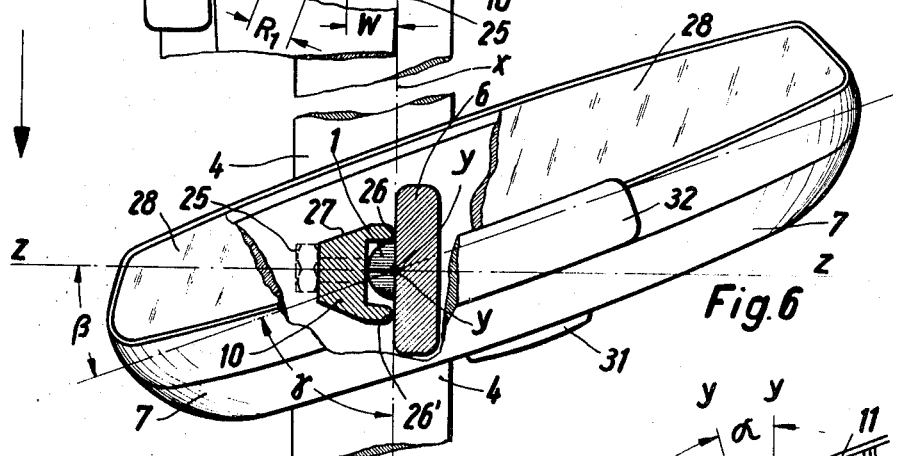
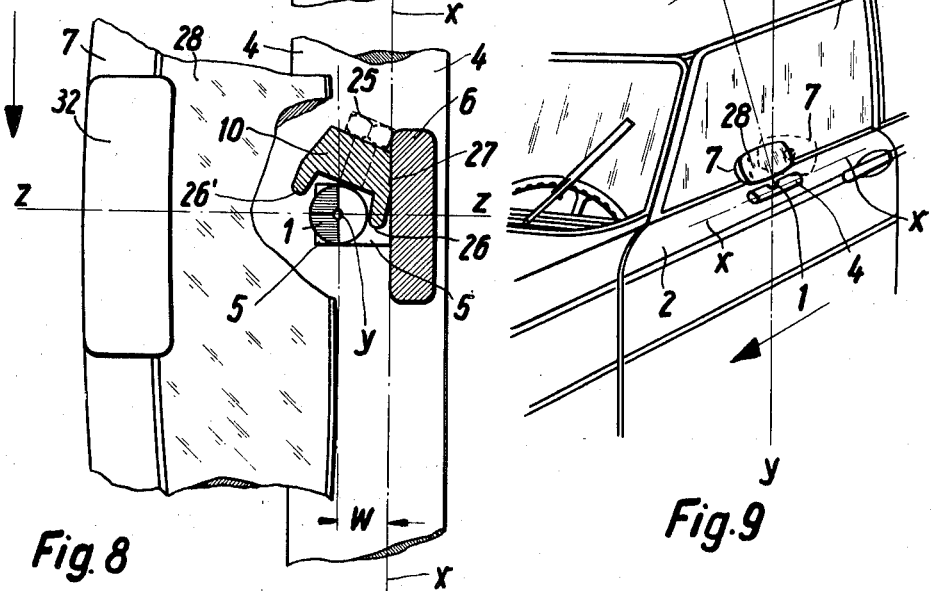

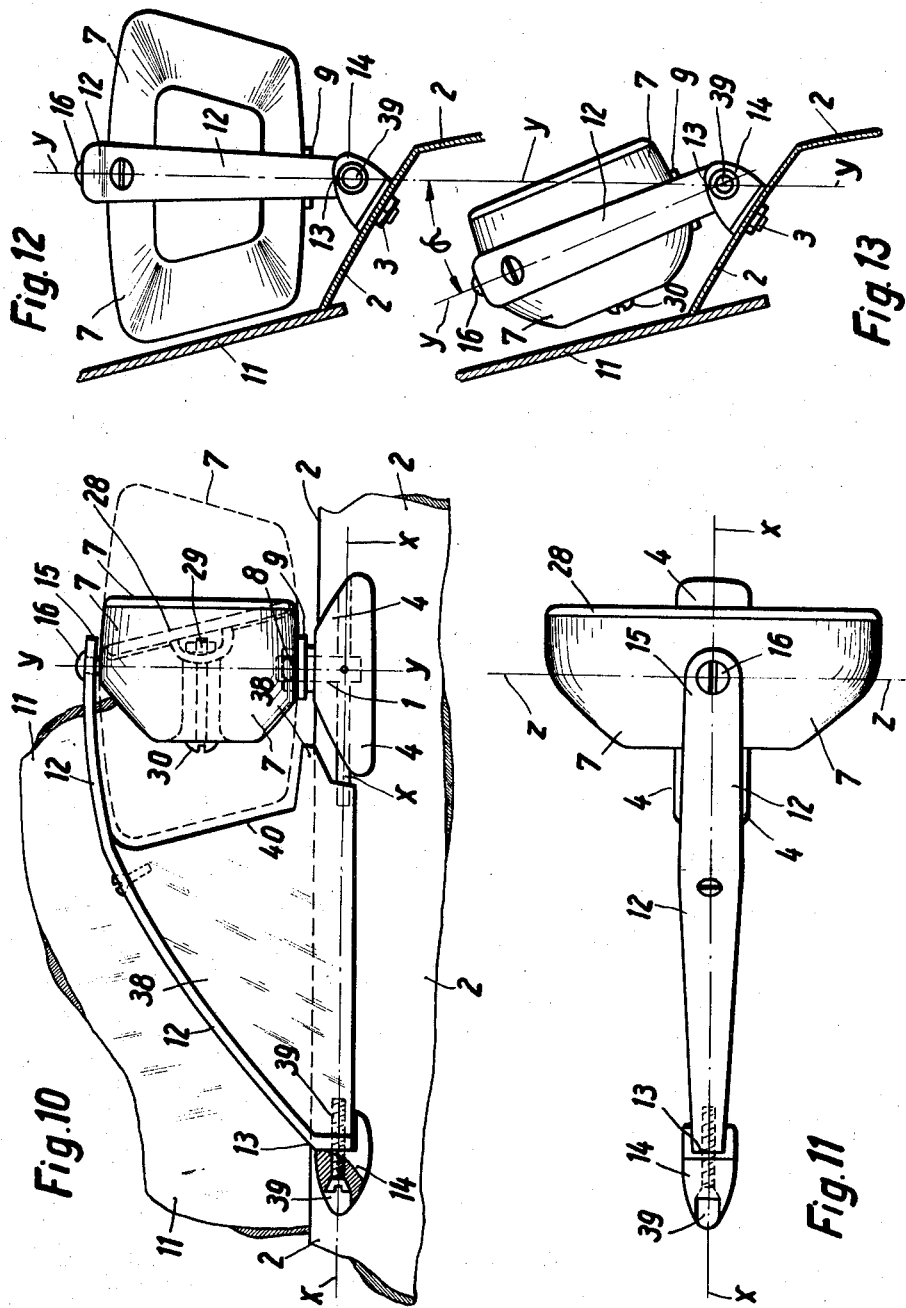

3,599,927

REARVIEW MIRROR

BACKGROUND OF THE INVENTION

The present invention relates generally to a rearview mirror, and more particularly to an external rearview mirror. Still more particularly the invention relates to an external rearview mirror for motor vehicles.

External rearview mirrors for motor vehicles are known in a great variety of different constructions. Initially these external rearview mirrors were mounted relatively far forwardly of the windscreen of the vehicle on or both of the front fenders. To minimize the possibility of injury in case of a collision with a human being, such rear view mirrors were usually mounted yieldably, that is they were provided with a spring mounting.

The trend in automobile constructions for some years now has made this type of mounting impractical. Windscreens have been curved to increasingly greater extents for aerodynamic reasons, and necessarily the area of the windscreen which can be kept clear by windshield wipers has become smaller with respect to the total windscreen area, because windshield wipers cannot extend onto the laterally outermost strongly curved portions of the windscreen. For this reason it is now more and more common to mount the external rearview mirror far backward on the vehicle, namely on the front door just rearwardly of the windscreen where the driver can look into the mirror through the side window and can also adjust the mirror by reaching through the side window.

However, with this type of mounting the available space is rather limited and the spring mounts used for rear view mirrors when the same were placed on the fenders, and enabling the mirror to yield in all directions in response to an impact, are not practical because there is simply not enough space available for a door-mounted rear view mirror to yield uncontrolled in all directions.

SUMMARY OF THE INVENTION

It is, accordingly, an object of the present invention to overcome this disadvantage.

A more particular object of the present invention is to provide an external rearview mirror particularly for mounting on the door of a motor vehicle which, when it receives an impact acting in the longitudinal direction of the vehicle, that is either from front to back or back to front, will necessarily yield in such a manner that the mirror is retracted from its normal operating position extending laterally beyond the coachwork of the vehicle, to a position where it becomes located in the recess between the upper door edge and the lateral door window.

In pursuance of the above objects, and others which will become apparent hereafter, one feature of my invention resides in providing an external rear view mirror, particularly for a motor vehicle having a longitudinal axis coincident with its direction of forward movement, which rearview mirror comprises a base arranged to be mounted on the coachwork of the vehicle and an arm mounted on the base projecting upwardly therefrom and tiltable about a first axis which is at least substantially parallel to the longitudinal axis so that the arm can move from a normal operating position in which it extends outwardly beyond the coachwork to a retracted position. A mirror-head is associated with the arm and means is provided mounting the mirror-head on the arm for turning movement about an upright second axis normal to the longitudinal axis. The means is operative for effecting tilting of the arm about the first axis in direction towards the coachwork in response to turning movement of the mirror-head initiated by an impact on the same acting in direction of the longitudinal axis of the vehicle.

According to a further feature of my invention I provide a rearview mirror having an elongated protective bracket mounted on the base with its forward end portion facing in the direction of movement of the vehicle and its rearward end portion facing oppositely that direction, and being provided with an upper edge face extending from the forward to the rearward end portion and having a gradual upward and rearward inclination. The bracket is so mounted on the base that it can turn about an axis substantially paralleling the longitudinal axis of the vehicle, and on the rearward end portion below the upper edge face there is mounted a mirror-head for turning movement with the bracket about this axis as well as for turning movement relative to the bracket about a normally upright axis. The purpose of this bracket with its gradually rearwardly rising upper edge face is not only for the mirror-head to move from normal operating position to a retracted position in response to an impact, but also the edge face is to deflect the body of a person impacting against the mirror so as to avoid or at least reduce as much as possible the danger of injury.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a partly sectioned elevational view of a rearview mirror according to one embodiment of my invention, as seen from the front of the associated vehicle looking rearwardly;

FIG. 2 is a partly sectioned detail view of the embodiment in FIG. 1, but as seen from the left-hand side thereof;

FIG. 3 is a plan view of the embodiment in FIG. 2;

FIG. 4 is a diagrammatic side elevational view of the embodiment in FIG. 1;

FIG. 5 illustrates a component of the embodiment of FIG. 1 in side elevational view, end elevational view and top plan view;

FIG. 6 is a partially sectioned top-plan view of the embodiment of FIG. 1, the section being taken on the line A—B of FIG. 1;

FIG. 7 is a fragmentary view of FIG. 6, also seen in top-plan view but with the mirror-head turned towards the left as compared with FIG. 6 so as to extend in parallelism with the direction of movement of the vehicle;

FIG. 8 is similar to FIG. 7 but showing the mirror-head turned in direction opposite from that of FIG. 7 and then into a position of parallelism with the direction of movement of the vehicle;

FIG. 9 illustrates in a perspective view the left front door of a vehicle having the mirror according to the embodiment of FIGS. 1—8 mounted thereon, solid lines illustrating the retracted position of the mirror and broken lines illustrating the normal operating position thereof;

FIG. 10 illustrates a further embodiment of the invention wherein my rearview mirror is provided with a protective bracket and mounted on the fragmentarily illustrated left front door of the vehicle;

FIG. 11 is a top-plan view of the mirror shown in FIG. 10 with the vehicle door omitted;

FIG. 12 is an end view of the mirror of FIG. 10 in operating position as seen from the front end of the vehicle looking towards the rear thereof; and FIG. 13 is the same view as in FIG. 12 but with the mirror moved to retracted position

DESCRIPTION OF THE PREFERRED EMBODIMENTS

In all embodiments illustrated in the drawing my mirror is shown as comprising a tiltably mounted arm which is in all embodiments identified with reference numeral 1.

Discussing now firstly the embodiment of FIGS. 1—9 it will be seen that this arm 1 is provided at its lower end with a slot through which extends a leaf spring 18 which is held in position by a setscrew 17. The opposite ends of the leaf spring 17 are received in two pockets downwardly open and provided in a socket 4 or base 4 (compare FIG. 2); the pockets are identified with reference numeral 19 and are so arranged that when the opposite ends of the leaf spring 18 are received in the respective pockets, they are slightly twisted with respect to the center portion of the leaf spring so that the latter is given a predetermined amount of pretension. Pins 36 prevent the end portions of the leaf spring 18 from sliding out of the pockets 19.

The base or socket 4 is provided with an elongated opening 5 through which the arm 1 extends and in which it abuts against an abutment surface 6 provided at the upper wall of the socket 4. The elongation of the opening 5 extends and in which it abuts against an abutment surface 6 provided at the upper wall of the socket 4. The elongation of the opening 5 extends and in which it abuts against an abutment surface 6 provided at the upper wall of the socket 4. The elongation of the opening 5 extends in parallelism with the transverse axis z–z of the vehicle in which the mirror is mounted, that is the axis which intersects the longitudinal axis of the vehicle extending in the direction of movement of the latter. The leaf spring 18 constitutes the horizontal axis x–x about which the arm 1 can tilt and it will be seen that the axis x–x extends at least in substantial parallelism with the longitudinal axis of the vehicle (compare FIG. 9). In rest position the half-round center portion of the arm 1 abuts against the abutment surface 6 as pointed out before and is movable in the elongated opening 5 between guide surfaces 35 bounding the latter against the tension exerted by the leaf spring 18 in an angle $\alpha$ inwardly towards the side window 11 of the vehicle door.

The socket 4 is mounted via screws 3 on the downwardly inclined upper edge of the front door 2 and is provided (compare FIGS. 2 and 3) at its upper side with a rectangular cutout 21 and in its hollow interior with a guide groove 22. A sliding member 20 is provided consisting of spring steel or the like and having in the illustrated embodiment a substantially J-shaped configuration. The member 20 extends through the cutout 21 and is with a part of its elongation guided in the guide groove 22. Its free end 23 is upwardly bent and can be moved into registry with the elongated opening 5 such that it fills that portion of the opening 5 which is not occupied by the arm 1. However, it can also be retracted. If it is located in registry with the opening 5 it prevents the arm 1 from movement away from the abutment face 6 inwardly towards the window 11.

FIG. 1 shows that the arm 1 carries at its upper end an intermediate member 9 having an axial bore 41 of substantially prismatic cross section. The arm 1 is provided in the region of its upper free end with a circumferential groove 33 and a set screw 34 penetrates the intermediate member 9 and has a conically tapering leading end which is adapted to extend into the circumferential groove 33 so as to mount the intermediate member 9 on the arm 1. The upper end of the intermediate member 9 has, as shown in FIG. 1, a hemispherical configuration and cooperates with a concavely recessed calotte provided at the underside of a mirror-head 7, with which calotte constitutes a ball and socket joint 8. The bore 41 has, at the side opposite the leading end of jet screw 34, a cross section resembling an obtuse-angle hollow prism to permit the play of the intermediate member 9 on the arm 1 to be adjusted at will. Thus, the mirror head 7 can be moved with respect to the intermediate portion 9 against requisite frictional resistance about the vertical axis y–y defined by the arm 1 when the same is in operating position, that is in the position illustrated in FIG. 1. Of course, the mirror-head 7 can additionally be fine-adjusted in all directions. To enable the vehicle operator to carry out a simple and quick turning and/or fine-adjustment of the mirror-head 7 without having to leave the drive seat, the member 20 has been provided which can be reached by the operator simply through the front window of his vehicle and, when moved to its blocking position illustrated in FIG. 2, will prevent the arm 1 from moving out of its operating position in which it defines the vertical axis y–y shown in FIG. 1. Now the mirror-head 7 can be adjusted at will and subsequently the member 20 is withdrawn from its blocking position to permit the arm 1 and the mirror-head 7 to become retracted under the circumstances and in the manner still to be described.

In normal operating position the mirror-head 7 will be positioned as shown in FIG. 1 and as again shown in FIG. 6, that is the mirror-plate 28 of the mirror-head 7 will include with the transverse axis z–z of the vehicle and angle $\beta$ and the outer portion of the mirror-head 7 will extend laterally outwardly beyond the coachwork of the vehicle. It may thus collide with human beings or with other vehicles and it is the purpose of the invention to effect automatic retraction of the mirror to within the confines of the widest portion of the vehicle coachwork in response to an impact resulting from such a collision.

As shown in FIGS. 5—8 I provide a cam member 10 whose side-elevational view in FIG. 5 shows it to be of substantially L-shaped configuration. The upright arm of the member 10 is secured by means of a screw 25 on that side of the intermediate member 9 which faces towards the side window 11 of the vehicle door 2. The other arm of the member 10 is bifurcated, as most clearly seen in the top-plan view of FIG. 5, and comprises two projections 26 and 26' whose outwardly directed edge faces include with a center line through this other arm an angle $\beta$ (compare the top-plan view in FIG. 5). The projections 26 and 26' embrace below the lower end of the intermediate member 9 a portion of the arm 1 which is of semicircular cross section and in the operating position of the arm 1 both of the projections 26 and 26' abut against the abutment face 6 on the socket 4.

If, now, the mirror-head 7 projecting laterally beyond the coachwork of the vehicle as shown in FIG. 6, receives an impact from the front of the vehicle, that is an impact acting in rearward direction, then the mirror-head 7 will turn through the angle y (see FIG. 6) which amounts to 90°, and additionally the intermediate member 9 and the cam member 10 will similarly move through the same angle about the axis y–y (see FIG. 1). When this occurs, the projection 26' of the cam member 10 engages the abutment face 6 with the active radius $R_2$ (FIG. 7) and this results in automatic tilting of the entire mirror consisting of the arm 1, the intermediate member 9 and the mirror-head 7 about the axis x–x through the distance W and the angle $\alpha$ (FIG. 1) inwardly towards the rear window 11. In this case the mirror-plate 28 will become located closely adjacent to the window 11 as shown in FIG. 7.

Conversely, if an impact is exerted upon the mirror-head 7 acting from the rear of the vehicle, for instance by another vehicle overtaking the one provided with the mirror, then the other projection 26 will contact the abutment face 6 with the considerably smaller active radius $R_1$ so that, despite turning of the mirror-head 7 through the initial angle $\beta$ and the additional 90°, the mirror consisting of the mirror-head 7, the intermediate member 9 and the arm 1 will be tilted inwardly towards the side window 11 through the angle $\alpha$ except that in this case the mirror-plate 28 will face outwardly away from the window 11 and the inclined side face 27 of the cam member 10 which in this case has been turned through more than 90°, will abut against the abutment face 6.

Cushioning means may be provided on the mirror head 7 in form of projections 31 and/or strips 32 of cushioning material (see FIG. 4) for cushioning impacts of the mirror head upon the coachwork when the arm moves to retracted position.

FIG. 9 illustrates in a broken line the normal operating position of the mirror-head 7 and in full line the position which the mirror-head 7 and in full line the position which the mirror-head 7 will assume after having received an impact acting in direction from the rear of the vehicle towards the front thereof, that is the second possibility described above.

It is readily evident that in its normal operating position the mirror-head is already inwardly inclined at an angle $\beta$ with respect to the transverse axis z–z of the vehicle. This is shown in FIG. 6 and is necessary for the vehicle operator to obtain a proper view of the road behind the vehicle. However, this also necessitates that if an impact acts upon the mirror-head 7 from the front of the vehicle, the mirror-head must turn through an angle which is smaller than 90° by the angle $\beta$, whereas if the impact is exerted from the rear of the vehicle, the mirror-head must turn through an angle which is greater than 90° by the angle $\beta$. At the same time, however, the tilting angle $\beta$ must always be the same regardless of the direction from which the impact is exerted upon the mirror-head 7. The necessary compensation for this is obtained in providing the upwardly extending leg of the cam member 10 with a transversely elongated opening 24 (compare the end elevational view in FIG. 5); in conjunction with a screw 25 and a toothed washer 42 this permits the member 10 to be continuously variably connectable to the intermediate member 9 in such a manner that its two projections 26 and 26' will abut against the abutment face 6 of the socket 4 with different active radii so that a uniform tilting angle $\alpha$ is obtained despite the different turning angles of the mirror-head resulting from impacts acting from different directions.

In circumstances where my novel mirror is manufactured in large quantities, for instance, if it is intended for a vehicle manufactured in large series, it is possible, and indeed advantageous to determine in advance the necessary active radii $R_1$ and $R_2$. This avoids the necessity for making the positioning of the member 10 with respect to the member 9 adjustable so that the members 9 and 10 can be manufactured of one piece, for instance as an inexpensive cast member. Of course, it will then be necessary to provide a mirror-reversed version of this member for such mirrors which are to be mounted on the right-hand front door of the vehicle as opposed to the mounting on the left-hand front door which has been illustrated in all of the embodiments shown. However, the economies obtained will still outweigh the additional expense for making two versions of the same member. The same is true for the mirror-head 7 whose ball-and-socket joint 8 is advantageously provided laterally offset. The socket 4 and the arm 1, on the other hand, can be used either on the left-hand or the right-hand front door if they are symmetrically configured, the only difference being that in one case the member 20 will be located forwardly of the arm 1 with respect to the direction of movement of the vehicle, and in the other case it will be located rearwardly of the arm, but in both cases it will be readily accessible for the operator through the side window of the respective door.

Proper adjustment of the mirror to obtain clear view of the road behind the vehicle requires not only movement of the mirror through the angle $\beta$ with respect to the transverse axis $z-z$ of the vehicle (FIG. 6), but also a tilting upwardly towards the face of the vehicle operator. Because of this it may be advantageous to give the housing of the mirror-head 7—as seen from the side—a substantial wedge shape (compare for instance FIG. 4) so that the mirror-plate 28 is already inclined upwardly with respect to the vertical axis $y-y$ at an angle $\delta$ so that only minor fine adjustments are necessary in the positioning of the mirror-head 7 via the ball-and-socket joint 8 thereof.

The leaf spring 18 shown in FIGS. 1 and 2 may be replaced, if desired, by a simple rod of circular cross section, surrounded by convolutions of a helical spring one end of which is connected with the arm 1 and the other end of which is connected with a surface at the interior of the socket 4, abutment being sufficient for such connection, with the spring being again under pretension.

Coming now to the embodiment illustrated in FIGS. 10—13 it will be seen that this differs from the one of the preceding figures. Here, a protective bracket 12 is provided which is intended to deflect and thus protect against injury any persons or animals which might collide with the mirror. The front end 13 of the bracket 12, that is the end facing forwardly in the direction of movement of the vehicle, is mounted in a support 14 secured to the door 2, turnable about an extension of the axis $x-x$, which extension is constituted by a screw 39. The upper edge face of the bracket 12 (compare FIG. 10) rises gradually in direction rearwardly towards the tilting 7. The construction and mounting of the mirror-head 7 may be the same as in the embodiment of FIGS. 1—9. The rear end portion 15 of the bracket 12 overlies the upper side of the mirror-head 7 and is secured thereto by a screw 16 coaxial with the turning axis $y-y$ so that the mirror-head 7 is freely turnable about the axis $y-y$ underneath the portion 15 of the bracket 12. Inward tilting of the mirror-head 7 from its normal operating position shown in FIG. 12 to its retracted position shown in FIG. 13 through the angle $\alpha$ (FIG. 13) occurs as discussed in the description of the embodiment of FIGS. 1—9. However, in the embodiment of FIGS. 10—13 such inwardly tilting of the mirror-head 7 necessarily results in inwardly tilting of the protective bracket 12 through the same angle and in unison with the mirror-head 7.

The space below the protective bracket 12 can remain open or may be closed if desired. In the latter case it may for instance be closed with a transparent or opaque member 38 provided with a cutout 40 for the mirror-head 7 and either secured to or of one piece with the bracket 12.

In this embodiment the housing of the mirror-head 7 is assumed to be drawn or cast and of symmetrical configuration; it is shown as having in vertical cross section an approximately rectangular form with the corners of the rectangle facing forwardly tapered (compare FIGS. 10 and 11), this configuration being aerodynamically advantageous. In this embodiment the mirror-plate 28 is adjustable via a joint 29 to desired angular positions with respect to and within the housing of the mirror-head 7, and a screw 30 serves to fix the mirror-plate 28 in the respective selected position of adjustment. A simple pivot joint 8 connects the mirror-head 7 of FIGS. 10—13 with the intermediate member 9 in such a manner that it can be turned at will about the vertical axis $y-y$. This embodiment is usable on the left-hand as well as on the right-hand side of a vehicle.

It will be appreciated that where the configuration of the door permits, the provision of a separate support 14 may not be necessary and in this case the socket 4 can simply be extended to the region of the front portion 13 of the bracket which is then mounted on the extended part of the socket 4 in the same manner in which it is shown mounted on the support 14. The upper side of the extended part of the socket 4 may be rounded and the lower edge of the member 38 may be correspondingly concave so that the two will present an aesthetically pleasing appearance where they are located adjacent one another. It is further possible to make the underside of a thus extended socket 4 somewhat concave intermediate its ends provided with the mounting screws 3, so that it can be used with bores having a pronounced curvature, and in this case a sealing gasket may be provided having an upwardly extending portion which conceals this upward concavity in the underside of the socket 4.

It has already been pointed out that the insert member 38 may be of one piece with the protective bracket 12, or that it may be secured thereto. Evidently, different means of securing may be utilized, a screw having been shown in FIG. 10 in phantom lines, Of course, adhesives may also be used. Because of the relatively large surface area of this insert member 38, chrome plating thereof would be rather expensive as well as being "flashy," and I therefore prefer to construct the insert member 38 as a separate discrete member of transparent material, advantageously plastic, which has the additional advantage not to interfere with an attempt of the vehicle operator to loop downwardly through the member 38.

While in FIGS. 10—13 I have shown the basic mirror to be of the general type disclosed in FIGS. 1—9, and to be provided with the additional protective bracket 12, I wish it understood that the protective bracket 12 can be utilized with other types of external rearview mirrors in which case it will clearly still have a significant safety function.

It will be understood that each of the elements described above, or two or more together, may also find a useful application in other types of constructions differing from the types described above.

While the invention has been illustrated and described as embodied in an external rearview mirror, it is not intended to be limited to the details shown, since various modifications and structural changes may be made without departing in any way from the spirit of the present invention.

What I claim as new and desired to be protected by Letters Patent is set forth in the appended claims:

1. An external rearview mirror, particularly for a motor vehicle having a longitudinal axis coincident with its direction of forward movement, comprising a base arranged to be mounted on the coachwork of the vehicle; an arm mounted on said base projecting upwardly therefrom and tiltable about a first axis at least substantially parallel to said longitudinal axis from a normal operating position to a retracted position; a mirror-head associated with said arm and tiltable with the same so as to extend outwardly beyond the coachwork when said arm is in said normal operating position; and means mounting said mirror-head on said arm for turning movement about an upright second axis normal to said longitudinal axis and including cam means coacting with an abutment face on said base and operative for effecting tilting of said arm about said first axis in direction towards the coachwork in response to turning movement of said mirror-head initiated by an impact on the same acting in direction of said longitudinal axis.

2. A rearview mirror as defined in claim 1, said base comprising a hollow shell member provided with an upper wall, an elongated opening in said wall extending transversely of said longitudinal axis and through which said arm extends, said abutment face being provided on said upper wall; and wherein said means comprises a cam element of substantially L-shaped configuration and having a bifurcated leg embracing said arm transversely of the elongation of the latter and including two projections each arranged to engage said abutment face in response to turning movement of said mirror-head about said second axis in one or an opposite direction, and to thereby effect tilting of said arm about said first axis.

3. A rearview mirror as defined in claim 2; further comprising biasing means biasing said arm to said operating position thereof.

4. A rearview mirror as defined in claim 3, said biasing means comprising a leaf-spring operatively associated with said arm and serving to guide said arm for tilting movement about said first axis in response to turning movement of said mirror-head.

5. A rearview mirror as defined in claim 2; further comprising arresting means accessible to an operator of the vehicle and operable for arresting said arm and said means in said operating position to thereby enable turning adjustment of said mirror-head at the will of the operator and without initiation of said tilting movement about said first axis.

6. A rearview mirror as defined in claim 5, said arresting means comprising a cutout in said socket, a guide groove at the interior of said socket, and a springy member mounted for sliding movement in said cutout and along said guide groove between an advanced position in which a leading portion of said springy member extends across the free part of said elongated opening precluding movement of said arm in the latter, and a withdrawn position in which said leading portion is withdrawn from said free part.

7. A rearview mirror as defined in claim 2, said means including an intermediate member connected with said mirror-head and mounted on said arm turnable about the same and about said second axis; and wherein said cam element comprises an other leg slidably mounted on said intermediate member and integral with said bifurcated leg, said cam element being mounted on said intermediate member with one of said projections contacting said abutment face under a first active radius and with the other of said projections contacting said abutment face under a smaller second active radius, whereby different turning angles of said mirror-head, depending upon the direction in which an impact acts on the latter, are translated into a constant tilting angle of said arm from said operating position to said retracted position thereof.

8. A rearview mirror as defined in claim 7, said projections each having an outer edge face directed outwardly away from the bifurcation and inclined to the center axis intersecting said bifurcation midway between said projections, whereby when said mirror-head is inclined towards the vehicle for viewing an impact on the mirror-head longitudinally of said longitudinal axis and acting in the direction of movement of said vehicle, will result in initial turning movement of said mirror-head about said second axis through a predetermined angle and thereupon in further turning through 90° to said retracted position.

9. A rearview mirror as defined in claim 2, said mirror-head having a mirror plate facing away from the direction of forward movement of the vehicle, and said mirror plate being inclined slightly upwardly and in direction of forward movement of the vehicle, to thereby facilitate viewing by an operator inside the vehicle.

10. A rearview mirror as defined in claim 9, said mirror-head further comprising a housing having a rearwardly facing open side in which said inner plate is mounted and having in direction of said longitudinal axis a substantially wedge-shaped vertical cross section.

11. A rearview mirror as defined in claim 2, said mirror-head comprising a housing having a rearwardly facing open side in which said mirror-plate is mounted and having in direction of said longitudinal axis a cross section substantially resembling a rectangle having corners facing in forward direction of movement of the vehicle and converging towards one another in such direction; and wherein said mirror plate is mounted in said open side of said housing for adjustment relative thereto about at least one pivot axis.

12. A rearview mirror as defined in claim 2; and further comprising cushioning means provided on said mirror-head and positioned to cushion possible impacts of said mirror-head upon said coachwork in response to movement of said arm to said retracted position.

13. A rearview mirror as defined in claim 7, said arm having an upper free end portion of circular cross section and provided with a circumferential groove, and said intermediate member surrounding said upper free end portion and being provided with a setscrew threaded through a wall of said intermediate member and having a tapering leading portion extending into said groove.

14. A rearview mirror as defined in claim 13, said intermediate member having a bore accommodating said upper free end portion and having at the side opposite said leading end of said setscrew a cross section resembling an obtuse angle hollow prism so that the play of said intermediate member on said arm can be adjusted at will.